United States Patent [19]

Endo et al.

[11] Patent Number: 4,731,613
[45] Date of Patent: Mar. 15, 1988

[54] POSITIONING SYSTEM FOR A VEHICLE

[75] Inventors: Hiroshi Endo; Hiroshige Fukuhara, both of Yokosuka, Japan; Motoki Hirano, Mountain View, Calif.

[73] Assignee: Nissan Motor Company, Limited, Yokohama, Japan

[21] Appl. No.: 804,511

[22] Filed: Dec. 4, 1985

[30] Foreign Application Priority Data

Dec. 7, 1984 [JP]  Japan ................. 59-257485

[51] Int. Cl.$^4$ .................. G01S 5/02; G01S 3/02; G01C 21/00; H04B 7/185
[52] U.S. Cl. ..................... 342/357; 342/451; 342/461; 364/450
[58] Field of Search ............... 343/356, 357, 451, 457, 343/461; 364/450, 451

[56] References Cited
U.S. PATENT DOCUMENTS 4,232,313 11/1980 Fleishman ..................... 343/456
4,459,667 7/1984 Takeuchi .......................... 364/449

OTHER PUBLICATIONS

Perreault; Paul, Civilian Receivers Navigate by Satellite, MSN, Jan. 1981, vol. 11, No. 1, pp. 61-93.
Spilker, Jr.; J. J., GPS Signal Structure and Performance Characteristics, Navigation, Jnl. of the Inst. of Navigation, vol. 25, No. 2, Summer 1978, pp. 121-146.

*Primary Examiner*—Theodore M. Blum
*Assistant Examiner*—Gregory C. Issing
*Attorney, Agent, or Firm*—Schwartz, Jeffery, Schwaab, Mack, Blumenthal & Evans

[57] ABSTRACT

An improved positioning system for a vehicle is shown. In the system, when radio wave can be received from only one satellite, the current position of the vehicle is computed based on a pair of navigational data, which are brought by radio wave received at the current time and by radio wave received at an earlier time.

8 Claims, 13 Drawing Figures

POSITIONING SYSTEM FOR A VEHICLE

BACKGROUND OF THE INVENTION (1) Technical Field of the Invention

The present invention relates to a positioning system for a vehicle.

(2) Description of the Prior Art

Heretofore, a positioning system used, for instance, for the route guidance unit for a vehicle employed for the most cases the system in which the vector that represents the shifted position of the vehicle is detected by means of a vehicle speed sensor and a direction sensor and the current position of the vehicle is found by integrating the values of the vector with respect to a reference position. In such a system, however, the detection errors in these sensors are accumulated as they appear so that it was necessary to provide some measures for removing these errors. With such a circumstance in mind, there has been proposed a positioning system which makes use of satellites called global positioning system (GPS) that is free from the problem of accumulation of these errors.

However, in GPS radio waves must be received simultaneously from three or more satellites to carry out a computation determining a current position of the vehicle, so that it fails to be feasible in an area where a plurality of GPS satellites cannot be observed.

SUMMARY OF THE INVENTION

An object of the invention is to provide a positioning system for a vehicle which makes it possible to carry out position measurement if only at least one satellite is observable.

Another object of the invention is to provide a positioning system for a vehicle, capable of finding the absolute coordinates of the vehicle when it is in city zones or areas among mountains, and in addition even when it is in a time zone in which the number of observable satellites is small.

BRIEF DESCRIPTION OF THE DRAWING

These and other objects, feature and advantages of the present invention will be more apparent from the following description of a preferred embodiment, taken in conjunction with the accompanying drawings, in which.

DESCRIPTION OF THE PREFERRED EMBODIMENTS

To facilitate the understanding of the present invention, a brief reference will be made to a prior art illustrated in FIGS. 1 and 2.

Figure 1:
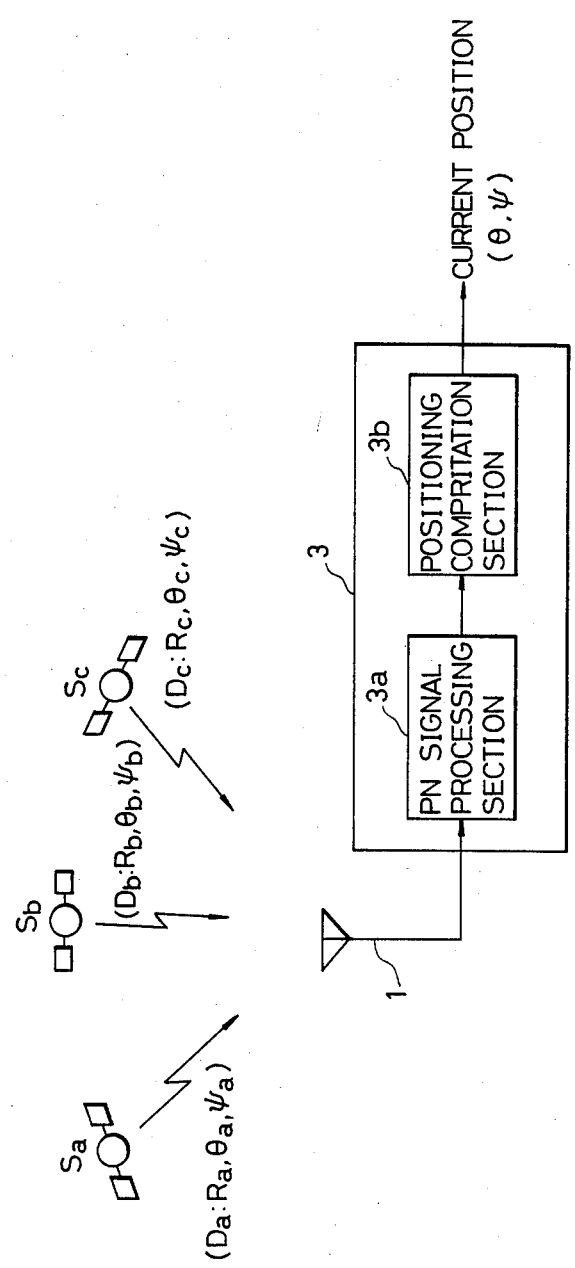
FIG. 1 is a block diagram of a prior art positioning system for a vehicle.

GPS consists, as shown by FIG. 1, of three GPS satellites Si (Sa, Sb, Sc) that radiate their respective navigational data at predetermined times, an omnidirectional antenna 1 which receives radio waves from these satellites, and a receiving apparatus 3 which analyzes and computes the radio waves received by the antenna 1.

The satellite Si has an atomic clock therein, and transmits with a predetermined timing its own current position as a radio wave (at 1575.42 MHz) which is represented as a PN (pseudo-noise) code. The current position $P_i$ of a satellite Si may be represented by $P_i(R_i, \theta_i, \psi_i)$ in terms of the spherical coordinates of the system that has the center of the earth as the reference point.

The receiving apparatus 3 includes a PN signal processing section 3a and a positioning computation section 3b.

The PN signal processing section 3a demodulates the high frequency signal (PN code) which is spectrally diffused. The positioning computation section 3b decodes the demodulated PN code to find the current position $P_i$ for each satellite and also evaluates the distance $D_i$ between each satellite Si and the receiving position by multiplying the propagation delay time for the radio wave emitted by each satellite by the velocity of light. Here, the propagation delay time $\Delta t_{di}$ is obtained by subtracting the offset time $\Delta t_u$ (bias in the clock) from the measured phase difference $\Delta t_i$.

As shown in FIG. 1, if three satellites can be observed, the longitude $\theta$, the latitude $\psi$, and the offset time $\Delta t_u$ for the vehicle can be found by deriving and solving a set of three-dimensional simultaneous equations. If the height (altitude) of the vehicle is desired in addition, it means that the number of unknowns is augmented by one so that it becomes necessary to have four satellites that can be observed simultaneously. The computation system for determining the position of the vehicle by means of a plurality of satellites that can be observed simultaneously will be referred to in what follows as the GPS computation system.

Figure 2:
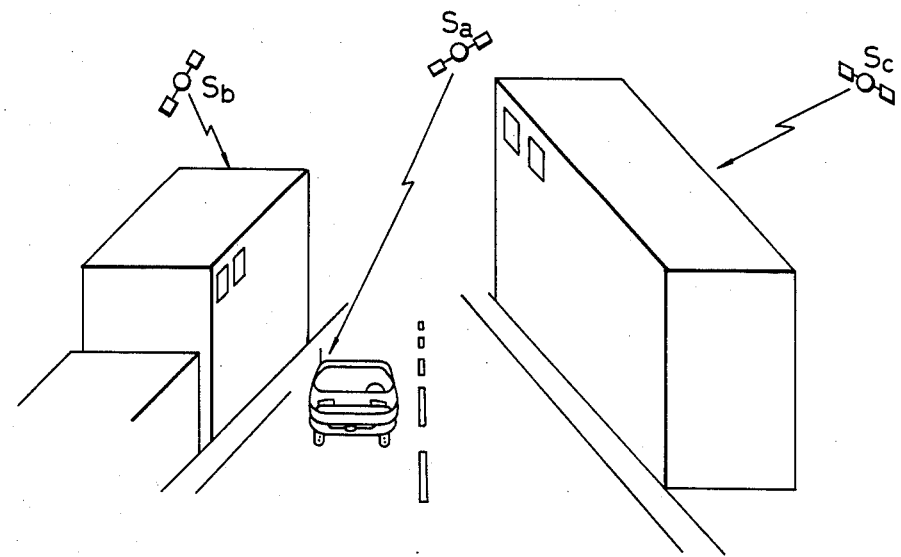
FIG. 2 is an explanatory diagram for illustrating the receiving condition of a vehicle which is driving in a city zone.

Since, however, such an existing positioning system that uses GPS is a system which permits position measurement only when a plurality (three, for example) of satellites are observable simultaneously, there is a problem that the position measurement fails to be feasible in driving in city zones where it may not always be possible to observe a plurality of GPS satellites, as shown by FIG. 2.

Figure 3:
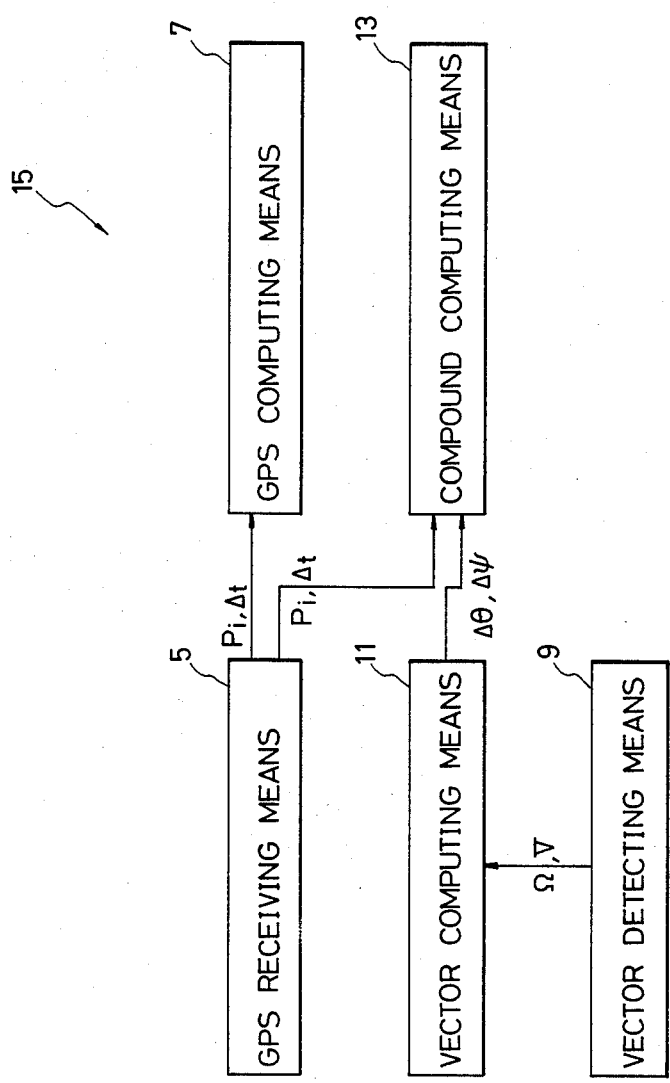
FIG. 3 is an explanatory diagram for the present invention.

Referring now to FIG. 3, an embodiment of the invention is shown. A positioning system 15 for a vehicle includes GPS receiving means 5 which receives a navigational data radiated at predetermined times from a satellite to analyze the position and the propagation delay time for the satellite, GPS computing means 7 which computes the receiving position by collecting the position and the propagation delay time as analyzed by the GPS receiving means 5 for a plurality of satellites, vector detecting means 9 which detects the shift amount of the vehicle as a vector, vector computing means 11 which computes the vector quantity for the shift amount of the vehicle by receiving the detection signal from the vector detecting means 9, and compound computing means 13 which computes the receiving position at a later time by receiving with a time interval the position and the propagation delay time for the satellite from the GPS receiving means 7 and the vector quantity representing the amount of vehicle shift which occurred during that interval from the vector computing means 11.

Figure 4:
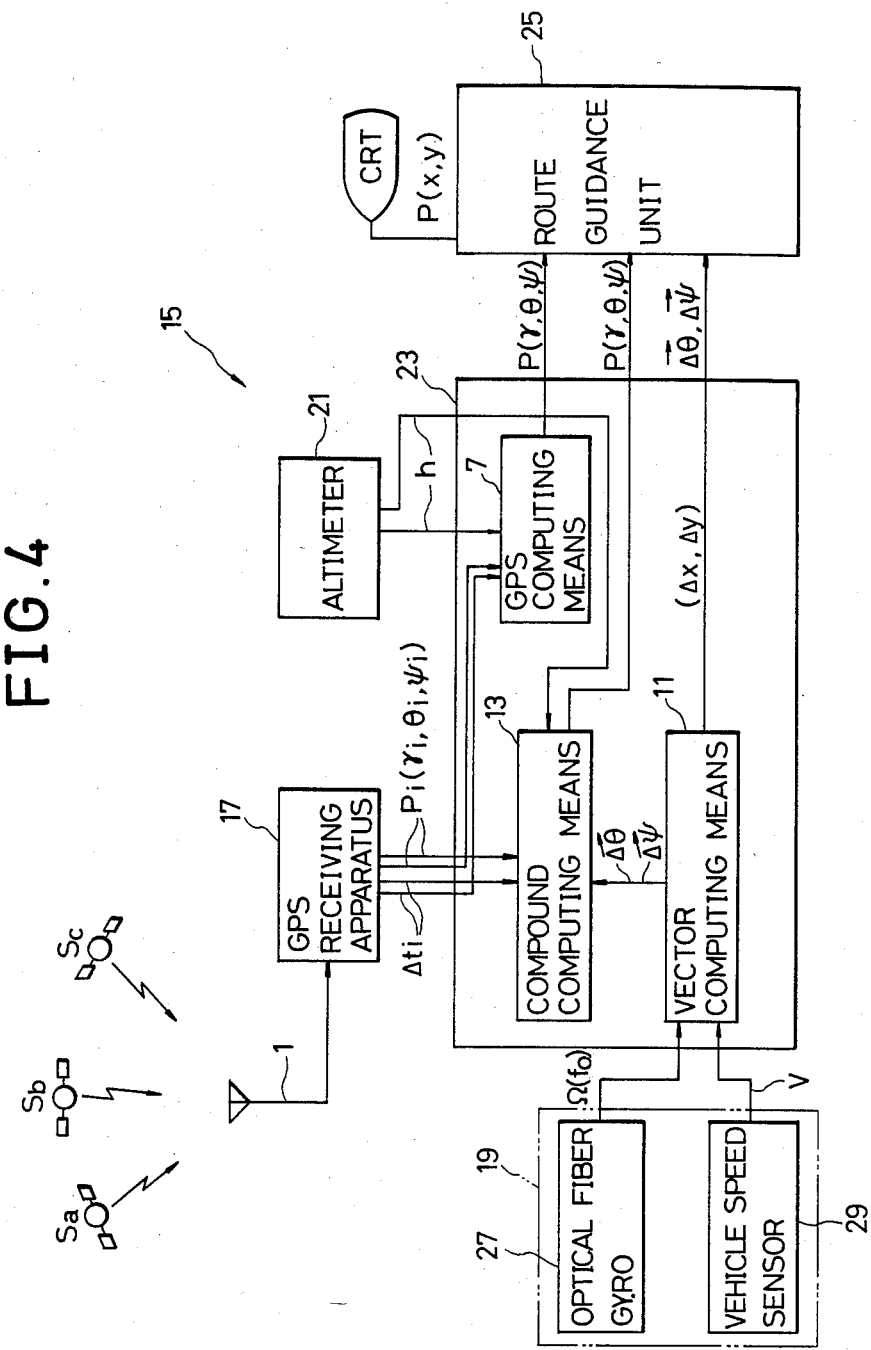
FIG. 4 is a block diagram for the positioning system for a vehicle utilized in the route guidance unit according to the invention.

In FIG. 4 is shown a block diagram illustrating an embodiment of the present invention.

The positioning system for a vehicle 15 includes a receiving apparatus 17 which corresponds to the receiving means 5 of FIG. 3, a detection apparatus 19 which corresponds to the vector detecting means 9 of FIG. 3, and a position computation apparatus 23 which has built-in computing means 7, 11, and 13 and an attached altimeter 21, with an arrangement in which the output from the position computation apparatus 23 is transmitted to a route guidance unit 25.

The receiving apparatus 17 has in its inside a PN signal processing section as shown in the prior art example, and analyzes the navigational data sent from the satellites $S_i$ ($S_a$, $S_b$, $S_c$, . . . ) via the antenna 1.

The vector detection apparatus 19 includes an optical fiber gyro 27 of frequency modulation system and a vehicle speed sensor 29. The optical fiber gyro 27 detects the angular velocity $\Omega$ of the vehicle while the vehicle speed sensor 29 detects the velocity V of the vehicle.

The position computation apparatus 23 consists, for example, of a microcomputer.

(I) Computational Process in the GPS Computing Means

Figure 5:
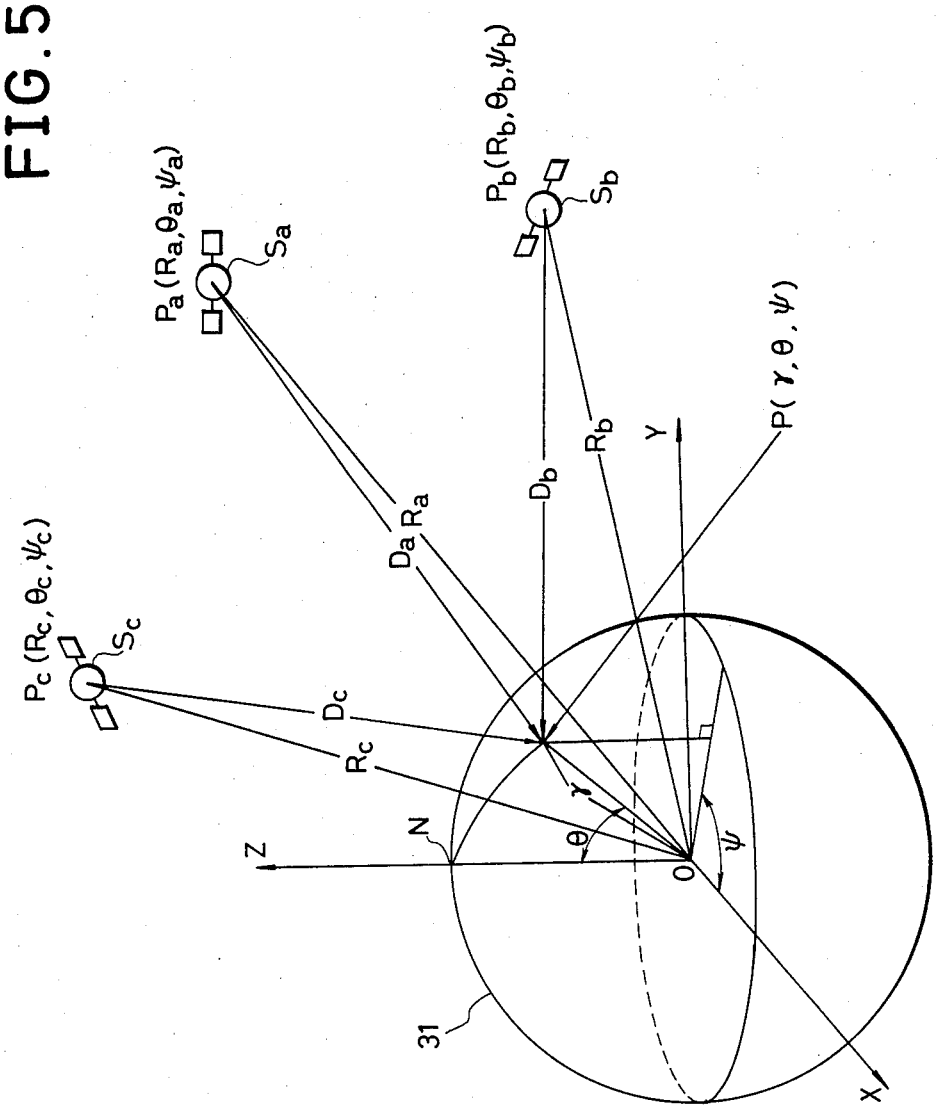
FIG. 5 is an explanatory diagram for the GPS computation system according to the invention.

Consider as shown by FIG. 5 a rectangular coordinate system with the center 0 of the earth 31 as the origin, X-Y plane in the equatorial plane, and Z axis passing through the north pole N. The vehicle position P may be represented by the spherical coordinates (r, $\theta$, $\psi$) where r is the radial distance (radius of the earth), $\theta$ is the latitude with the Z axis as the reference, and $\psi$ is the longitude with the X axis as the reference.

Assume that the vehicle is currently at the position P(r, $\theta$, $\psi$) and that three satellites $S_i$, namely, $S_a$, $S_b$, and $S_c$ are observable.

The radio waves radiated from the satellites Sa, Sb, and Sc are caught by the omnidirectional antenna 1 and are input to the receiving apparatus 17. At the receiving apparatus 17 the high frequency signal which is spectrally diffused by the PN code is demodulated and at the same time the phase difference $\Delta t_i$ of the PN code in terms of time received by the built-in clock is detected.

Through demodulation of the PN signals, the positions $P_i$[$P_a$($r_a$, $\theta_a$, $\psi_a$), $P_b$($r_b$, $\theta_b$, $\psi_b$) $P_c$($r_c$, $\theta_c$, $\psi_c$)] for the respective satellites and the respective phase differences $\Delta t_i$ ($\Delta t_a$, $\Delta t_b$, $\Delta t_c$) will be found.

In the phase difference $\Delta t_i$ for each of the satellite Sa, Sb, and Sc there is included the offset time (the bias with respect to the atomic clock in the GPS satellite) $\Delta t_u$ of the built-in clock in the GPS receiving apparatus. The phase differences $\Delta t_i$($\Delta t_a$, $\Delta t_b$, $\Delta t_c$) are the sum of the propagation delay times $\Delta t_{di}$ for the radio waves radiated from the respective satellites to reach the observation point (vehicle position) on the earth and the offset time $\Delta t_u$, and may be represented by the following equation.

$$\Delta t_i = \Delta t_{di} + \Delta t_u = D_i/C + \Delta t_u \tag{1}$$

where C is the velocity of light, $D_i$ is the distance and i=a, b, and c.

Here, the distance $D_i$ between the satellite Si and the vehicle position P can be represented by the following expression in terms of their rectangular coordinates.

$$D_i^2 = (x_i - x)^2 + (y_i - y)^2 + (z_i - z)^2 \tag{2}$$

Substituting the relations $$X_i = R_i \sin\theta_i \cos\psi_i, \quad Y_i = R_i \theta_i \sin\psi_i, \quad Z_i = R_i \cos\theta_i$$

and $$X = r\sin\theta\cos\psi, \quad Y = r\sin\theta\sin\psi, \quad Z = r\cos\theta$$

that express the rectangular coordinates in terms of the spherical coordinates for the satellite and the vehicle position, respectively, into Eq. (2), expanding the squares and rearranging, one obtains $$D_i^2 = r_i^2 + r^2 - 2R_i r\{\cos\theta_i \cos\theta + \sin\theta_i \sin\theta \cos(\psi_i - \psi)\}.$$

By expressing $\cos\theta_i \cos\theta$ and $\sin\theta_i \sin\theta$ as combinations of $\cos(\theta_i - \theta)$ and $\cos(\theta_i + \theta)$ the above equation becomes $$D_i^2 = r_i^2 + r^2 - r_i r\{\cos(\theta_i - \theta)[1 + \cos(\psi_i - \psi)] + \cos(\theta_i + \theta)[1 - \cos(\psi_i - \psi)]\} \tag{3}$$

From Eqs. (1) and (3) there is obtained $$D_i^2 = C^2(\Delta t_i - \Delta t_u)^2 = r_i^2 + r^2 - r_i r\{[1 + \cos(\psi_i - \psi)]\cos(\theta_i - \theta) + [1 - \cos(\psi_i - \psi)]\cos(\theta_i + \theta)\} \tag{4}$$

where i=a, b, and c.

Equation (4) includes three unknowns, namely, the offset time $\Delta t_u$ of the clock and the angular variables $\theta$ and $\psi$ of the current position P of the vehicle so that they can be determined by solving the set of three-dimensional simultaneous equations obtained by writing down Eq. (4) for three satellites $S_a$, $S_b$, and $S_c$.

It should be noted that if use is made of the height h obtained by the altimeter 21, then the height of the vehicle can also be known without increasing the number of the satellites to be observed.

Figure 6:
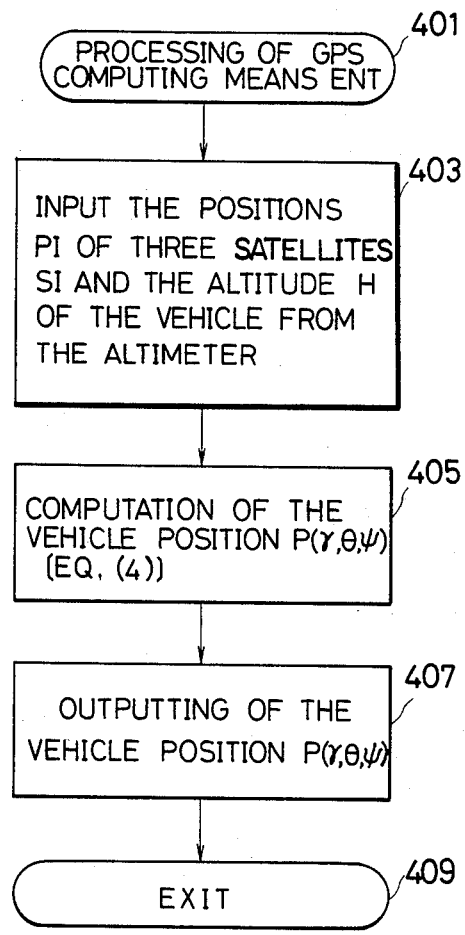
FIG. 6 is a flow chart for the GPS computation system.

In FIG. 6 is shown a processing flow chart for the GPS computing means 7.

In step 403 the positions $P_i$ and the phase differences $\Delta t_i$ for three satellites $S_i$ and the height h from the altimeter 21 are input, in step 405 the vehicle position P(r, $\theta$, $\psi$) is computed, and in step 407 the result of the above computation is output to the route guidance unit 25.

(II) Computational Process in the Vector Computing Mean

The formula for computing the angular velocity [rad/sec] of the vehicle by means of the optical fiber gyro 27 of frequency modulation system is given by $$\Omega = \lambda/2R_1(f_o = F_o) \tag{5}$$

where $\lambda$ is the wavelength (m) of the laser light, $R_1$ is the radius (m) of the fiber loop, $f_o$ is the frequency (Hz) of the high frequency signal, Fo is a constant (Hz).

Therefore, it becomes possible to detect the angular velocity $\Omega$ of rotation by counting the frequency $f_o$ (see Optical Wave Electronic Engineering, Corona Publishing Company, p.281).

From the angular velocity $\Omega$ of the vehicle, the vector quantity for the shiftings of the vehicle (variations $\Delta\theta$ and $\Delta\psi$ for the latitude and the longitude, respectively) can be found in the following way.

Figure 7:
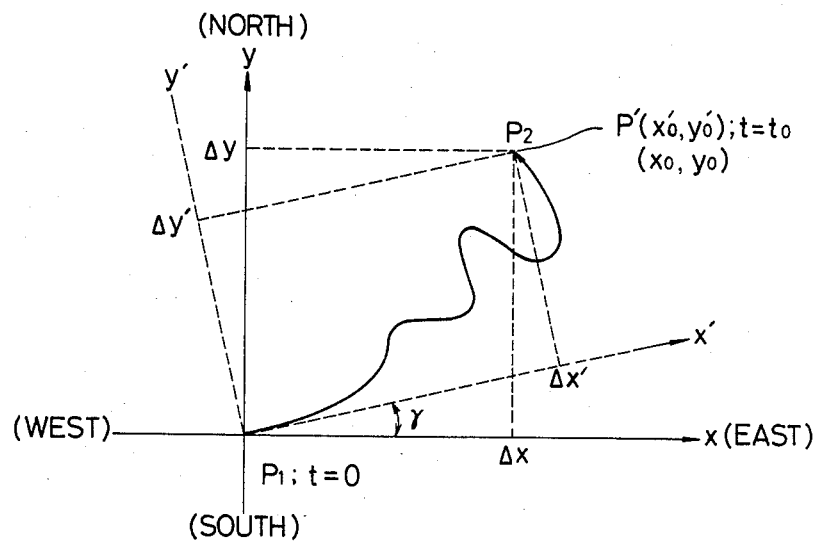
FIGS. 7 and 8 are explanatory diagrams for the vector computation system according to the invention.

As shown in FIG. 7, with the vehicle position $P_1$ at the beginning of measurement as the origin, X axis is taken in the direction of the east and Y axis is taken in the direction of the north. By setting time $t=0$ when the vehicle is at $P_1$ where it is running in the direction of $\gamma$ with respect to the X axis, a new axis X' is chosen along the direction of running $\gamma$ and a new axis Y' is chosen perpendicular to it. Then, the vehicle position $P_2(\Delta x', \Delta y')$ after elapse of time $t=t_0$ is given by the following equations.

$$\Delta X' = \int V(t)\cdot\cos[\int \Omega(t)dt]dt \quad (6)$$

$$\Delta Y' = \int V(t)\cdot\sin[\int \bullet(t)dt]dt \quad (7)$$

where $V(t)$ and $\Omega(t)$ are the instantaneous values of V and $\Omega$ at time t.

The transformation of the coordinataes x' and y' of the point $P_2$ given by Eqs. (6) and (7), respectively, to x and y coordinates are represented by the following.

$$\Delta x = \Delta x'\cdot\cos\gamma - \Delta y'\cdot\sin\gamma \quad (8)$$

$$\Delta y = \Delta x'\cdot\sin\gamma - \Delta y'\cdot\cos\gamma \quad (9)$$

Figure 8:
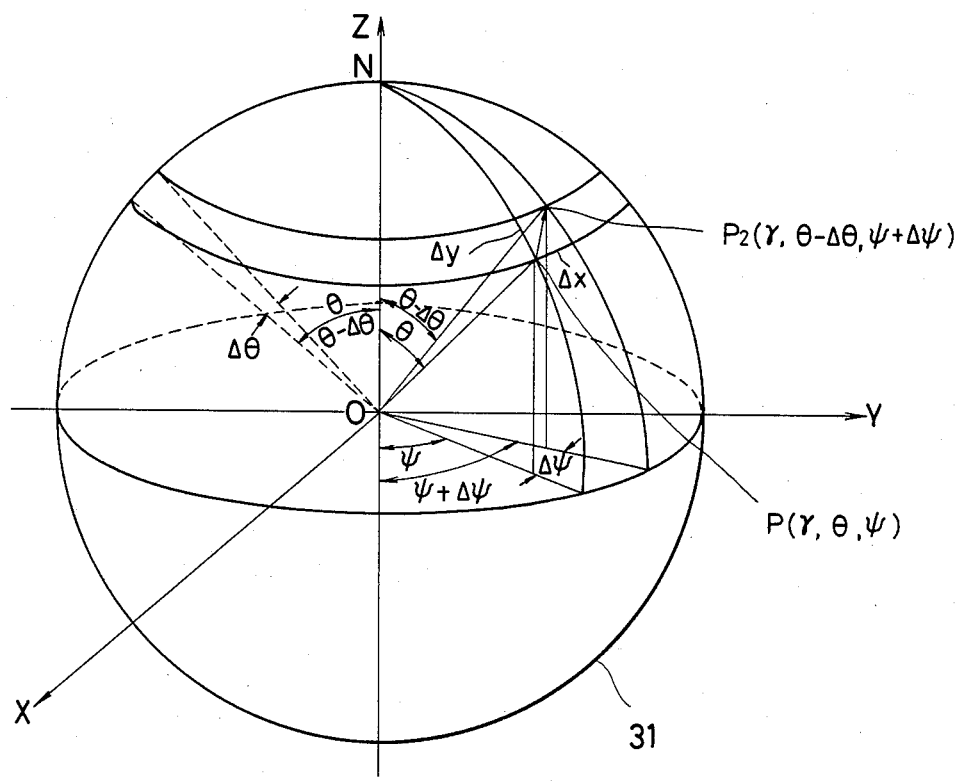

Referring to FIG. 8, the shift $\Delta x$ in the longitudinal direction and the shift $\Delta y$ in the latitudinal direction given by Eqs. (8) and (9), respectively, are seen to correspond to a latitude change $\Delta\psi$ and a longitude change $\Delta\theta$ as shown below.

$$\Delta\psi = \Delta x/r, \quad \Delta\theta = \Delta y/r \quad (10)$$

The vector values $\Delta\theta$ and $\Delta\psi$ for the amount of shift in the vehicle thus obtained as in Eq. (10) are fed to the compound computing means 13 or the route guidance unit 25 as indicated in FIG. 3.

Although it is arranged in this embodiment to feed the vector quantities $\Delta\theta$ and $\Delta\psi$ to the route guidance unit 25, it is of course possible to feed the values of $\Delta x$ and $\Delta y$ instead of $\Delta\theta$ and $\Delta\theta$ to represent a processing chart for the vector computing them directly on a CRT.

Figure 9:
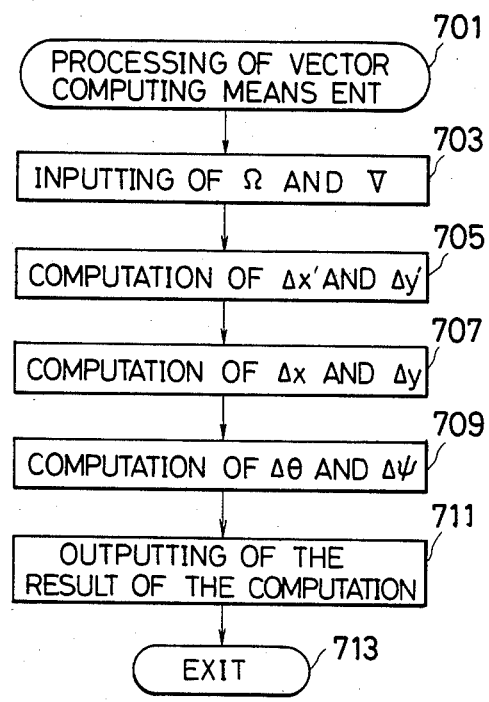
FIG. 9 is a flow chart for the vector computation system according to the invention.
Figure 10:
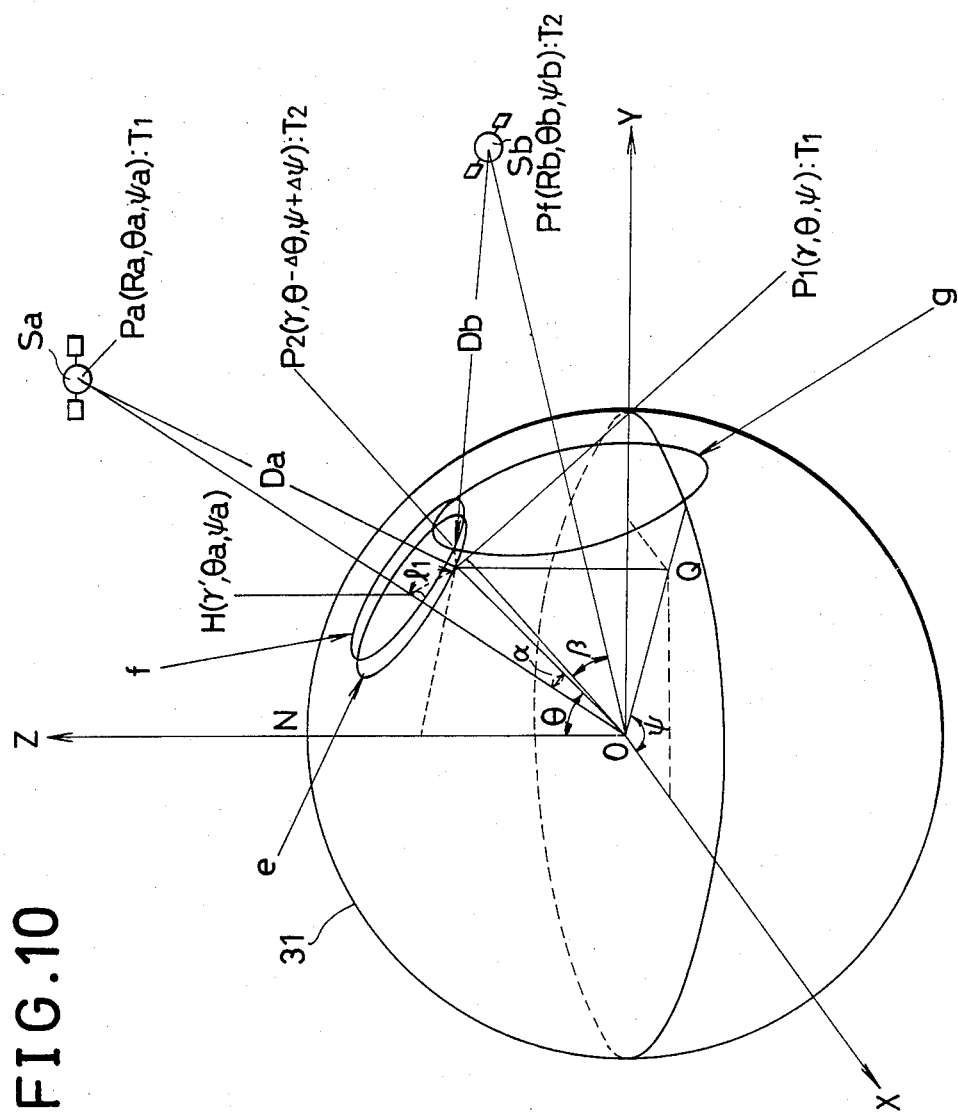
FIG. 10 is an explanatory diagram for the compound computation system accoding to the invention.

In FIG. 9 is illustrated a processing chart for the vector computing mean 21.

In step 703, angular velocity $\Omega$ from the optical fiber gyro 27 as well as the vehicle speed V from the vehicle speed sensor 29 are input. In step 705 $\Delta x'$ and $\Delta y'$, in step 707 $\Delta x$ and $\Delta y$, and in step 709 $\Delta\theta$ and $\Delta\psi$ are computed respectively. In step 711, the results of these computation are output to the route guidance unit 25 or the compound computing means 13.

(III) Computational Process in the Compound Computing Means

Assume that it is not possible to observe simultaneously two satellites from the vehicle position P such that one satellite is observed at time $T_1$ and another at time $T_2$.

The satellites Si in this case could be the same satellite as observed with a time interval so long as it is not a geostationary satellite. However, preferably observations of separate satellites that are situated a distance apart be made in succession.

(i) Suppose that a satellite Sa ($Y_a$, $\theta_a$, $\psi_a$) alone was observed at time $T_1$.

Assume that the (unknown) vehicle position is given by $P_1(r, \theta_1, \psi_1)$ (considering the radius r of the earth to be constant) and that the bias of the clock with respect to the atomic clock has already been corrected for.

First, from the result of analysis of the navigational data which is sent from the satellite Sa, the current position $P_a(r_a, \theta_a, \psi_a)$ of the satellite Sa in the spherical coordinate system with the center 0 of the earth 31 as the origin and the distance Di between the satellite Si and the vehicle can be determined. Here, the propagation delay time $\Delta t_{di}$ is to be determined by subtracting the offset time $\Delta t_u$ from the phase difference $\Delta t_i$ that has been measured previously.

Then, the (unknown) current position $P_1$ lies somewhere on the intersection e of the sphere of radius $D_a$ with the satellite Sa as the center and the sphere (earth) of radius r.

In the triangle that has three points 0, $P_a$, and $P_1$ as its vertices, the angle $P_aOP_1$ (planar angle) which is called $\alpha$ may be given from the cosine law as $$\cos\alpha = (R_a^2 + r^2 - D_a^2)/2rR_a \quad (11)$$

The coordinates of the foot H of the perpendicular from the point P1 to the straight line joining two points Pa and O are given by $H(r', \theta_a, \psi_a)$ where from the right triangle OP1H one has $$r' = r\cos\alpha \quad (12)$$

Furthermore, since the current position $P_1(r, \theta_1, \psi_1)$ lies on the circle e of radius $P_1H$ with the point H as the center, the distance $l_1$ between the points $P_1$ and H (radius of the circle e) may be represented by the following by referring to Eq. (3).

$$l_2 = r^2 + r'^2 - 2rr'\{\cos(\theta-\theta_a)[1+\cos(\psi-\psi_a)]+\cos(\theta+\theta_a)[1-\cos(\psi-\psi_a)]\} \quad (13)$$

Substituting $l_1 = r\cdot\sin\alpha$ and Eq. (12) into Eq. (13) the equation for the intersection e is obtained as (with $\cos\alpha = 0$)

$$0 = \cos\alpha - \cos(\theta-\theta_a)[1+\cos(\Psi-\Psi_a)] - \cos(\theta+\theta_a)[1-\cos(\psi-\psi_a)] \quad (14)$$

(ii) Suppose that the vehicle which was at the point $P_1$ at time $T_1$ moved to the point $P_2$ at time $T_2$.

The shifts of the vehicle during the time $T_2-T_1$, namely, the changes in the latitude and the longitude $\theta$ and $\psi$, respectively, are represented from Eqs. (8)–(10) by $$\Delta\theta = (1/r)(\Delta x'\cdot\sin\gamma + \Delta y'\cdot\cos\gamma),$$

$$\Delta\psi = (1/r)(\Delta X'\cdot\cos\gamma - \Delta y'\cdot\sin\gamma) \quad (15)$$

where $\Delta x'$ and $\Delta y'$ are given by Eqs. (6) and (7).

Since the vehicle position $P_1(r, \theta, \psi)$ lies on the circle e that satisfies Eq. (14), the vehicle position $P_2$ at time $T_2$ lies on a curve f obtained by replacing $\theta$ by $(\theta-\Delta\theta)$ and $\psi$ by $(\psi+\Delta\psi)$ in Eq. (14).

In other words, if the vehicle which was on the curve e at time $T_1$ moved by a fixed vector quantity $(\Delta\theta, \Delta\psi)$, then the vehicle will be at time $T_2$ on a curve f which is obtained by parallel displacing the curve e by a fixed vector quantity $(-\Delta\theta, \Delta\psi)$.

Here, by referring to Eq. (14), the equation for the curve f is given by $$\cos\alpha - \cos(\theta - \theta_a - \Delta\theta)[1 + \cos(\psi - \psi_a + \Delta\psi)] - \cos(\theta + \theta_a - \Delta\theta)[1 - \cos(\psi - \psi_a + \Delta\psi)] = 0 \quad (16)$$

(iii) Assume that a satellite Sb alone is observed at time $T_2$.

If it is assumed that at time $T_2$ only the radio wave radiated by a satellite $S_b$ is received, then the current position $P_b$ of the satellite Sb and the distance Db between the satellite Sb and the vehicle position P can be known.

The current position $P_2(r, \theta, \psi)$ lies on the intersection g (a circle) of the sphere of radius $D_b$ with center at the satellite Sb and the earth which is a sphere of radius r.

In the triangle with three points 0, $P_b$, and $P_2$ as its vertices, the angle $P_bOP_2$ which is called $\beta$ can be given from the cosine law by the following.

$$\cos\beta = (R_b^2 + r^2 - D_b^2)/2rR_b \quad (17)$$

Analogous to the procedure by which Eq. (14) was obtained the equation for the curve g is given (with cos $\beta$ 0) by $$0 = \cos\beta - \cos(\theta - \theta_b)[1 + \cos(\Psi - \Psi_b)] - \cos(\theta + \theta_b)[1 - \cos(\psi - \psi_b)] \quad (18)$$

(iv) Evaluation of the vehicle position $P_2$ at time $T_2$.

Since the current position $P_2$ of the vehicle (at time $T_2$) is situated at the intersecting point of the curve f defined by Eq. (16) and the curve g defined by Eq. (18), the current position $P_2(r, \theta, \psi)$ can be defined as the solution to the set of simultaneous equations formed by Eqs. (16) and (18).

It should be remembered here that although there exist two possible solutions to the above set only the intersecting point that is located in the region of special interest need be taken as the acceptable solution.

In the manner explained in the foregoing, if the radio waves radiated intermittently from at least one satellite can be received, then the vehicle position at times $T_1$, $T_2$, $T_3$, ... at which the radio waves are received intermittently can be evaluated.

It should be noted here that the form of the earth is represented by the equipotential surface of the gravitational field called geoid, and the distance r from the center of the earth to the mean sea level at a region of interest can be represented by $r + \Delta r$ ($\Delta r$: regional correction value).

Therefore, when the vehicle is near 0 m from sea level, its current position $P_2(r_1, \theta, \psi)$ may be evaluated from Eqs. (11), (15), and (17) by setting the radius of the earth to $r_1 = r + \Delta r$ Moreover, when the vehicle is operated in a region other than 0 m from sea level, the current position $P_2(r_2, \theta, \psi)$ may be evaluated by measuring the altitude h by means of the altimeter 21 and by replacing the radius of the earth in the above three equations by $r_2 = r_1 + h$ In this manner a highly precise position determination that takes into account the form of the earth and the altitude can be realized.

Figure 11:
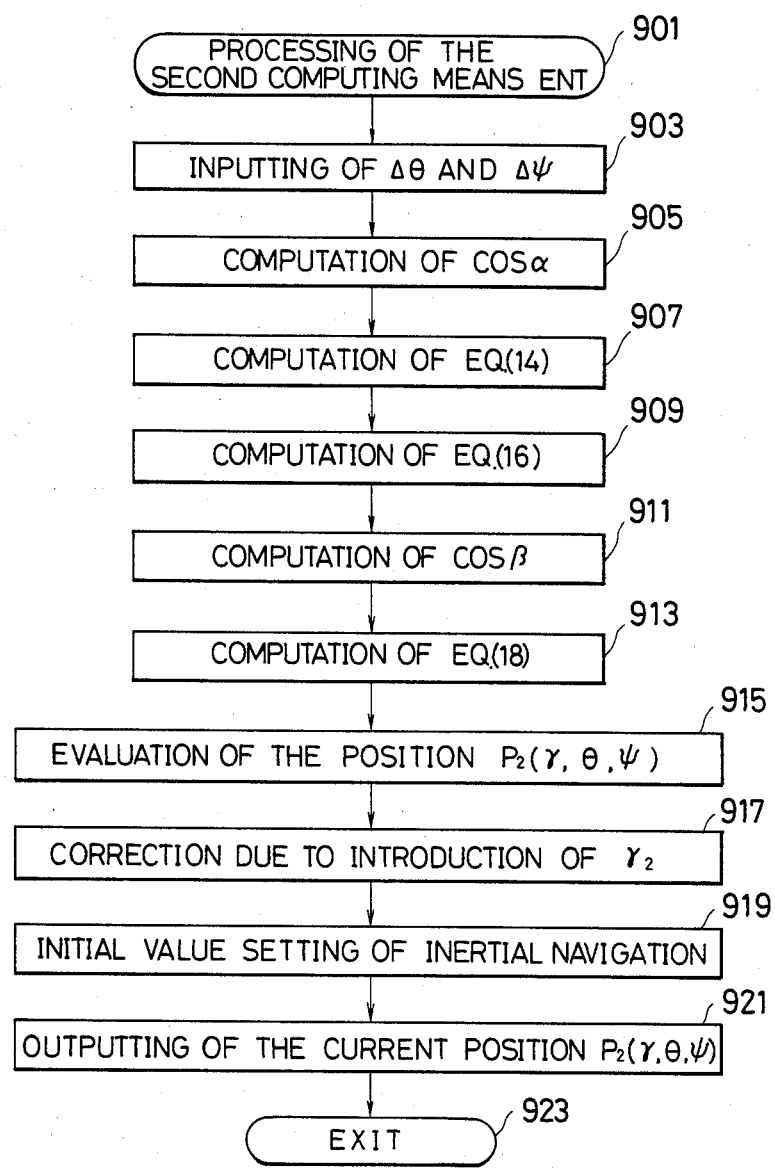
FIG. 11 is a flow chart for the compound computation system according to the invention.

The processings in the compound computing means 13 are shown in FIG. 11 as a flow chart.

The processings in each of the steps 903 through 917 are the same as have already been described in the foregoing so that no further explanation will be given. What is meant by initial value setting for inertial navigation in step 919 is to use the current vehicle position $P_2(r, \theta, \psi)$ or $P_2(r_2, \theta, \psi)$ thus determined as the starting point of the inertial navigational. Further, step 921 means that the obtained information is to be output to the route guidance unit 15.

Figure 12:
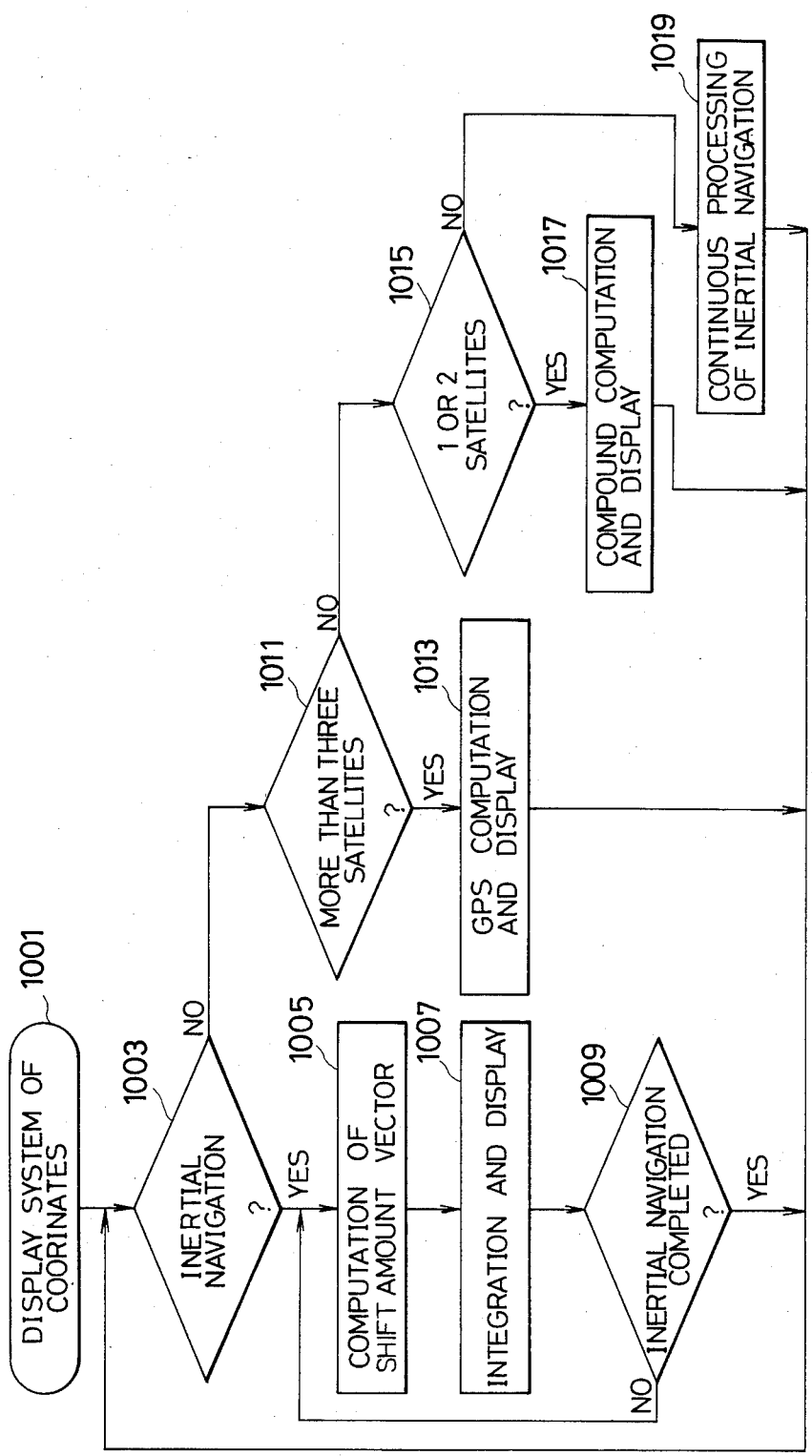
FIG. 12 is a flow chart concerning the display in the route guidance unit according to the invention.

In FIG. 12 is illustrated a processing flow chart concerning the route display.

The route guidance unit 25 includes a CRT (see FIG. 4) on which is displayed the locus of the vehicle.

Step 1003 is for judging whether a display by means of the inertial navigation should be carried out, and the display by the inertial navigation is continued until the error in the display becomes tolerable (for a duration in which the vehicle runs, for example, 1–5 km). When the inertial navigation is judged to be displayed, it received in step 1005 the vector quantity $(\Delta\theta, \Delta\psi)$ or $(\Delta x, \Delta y)$ from the vector computing means 21, and processes integration and display in step 1007.

After completing the inertial navigation in step 1009, it proceeds to step 1011 via step 1003 in order to have the absolute coordinates of the vehicle position, where the observation conditions on the satellites are judged.

If there are over three satellites that can be observed, it proceeds to step 1013 where it lets the GPS computing means 7 shown in FIG. 3 carry out the computation based on the usual GPS computation system, and receives the result of the computation to display the current position of the vehicle.

On the other hand, if the number of observable satellites is less than three, for instance, one, it proceeds to step 1015 where it is arranged to display in step 1017 the result of computation carried out in the compound computing means 13. Further, if in step 1015 none of the satellites is observable, it proceeds to step 1019 where it is arranged to continue the inertial navigation.

FIG. 11 illustrates the processing conditions of the route guidance unit 25 shown in FIG. 4.

Figure 13:
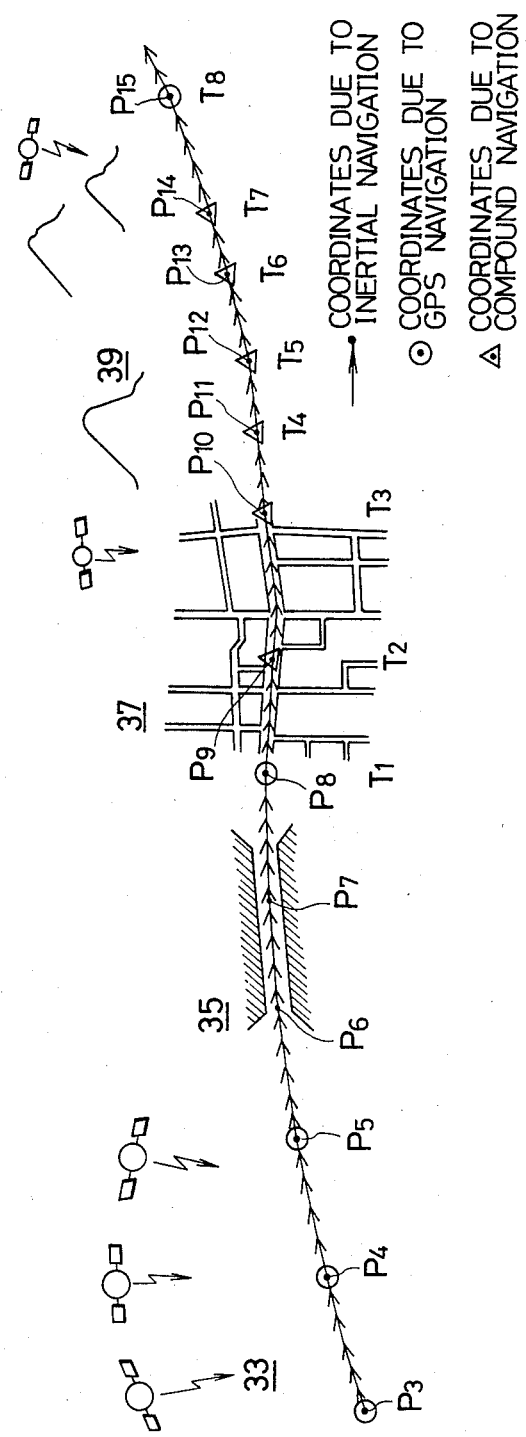
FIG. 13 is an explanatory diagram for an example of display of a driving locus according to the invention.

In FIG. 13 suppose that the vehicle runs from the point P3 on the left of the figure toward the point P15.

The small circle on the points $P_3$, $P_4$, and $P_5$ indicate that they are displays of the result of the GPS computation mentioned in step 913 above. Such a display becomes possible when a plurality of satellites are observable under such conditions as the vehicle is on a piece of flat land 33 and it is in the time zone in which a large number of satellites are observable. The arrows along the path indicate that they are displays due to the inertial navigation.

As soon as the vehicle enters a tunnel 35 at the point $P_6$ none of the satellites becomes observable while it remains inside of the tunnel 35, so that it has to rely solely upon the inertial navigation by the processing indicated by step 1019 of FIG. 12 until it clears the tunnel 35 to arrive at the point P8.

Now, when the vehicle enters a city zone 37, the number of observable satellites is reduced as in the former example illustrated in FIG. 12, and also the possible observation of the satellites becomes intermittent. Similarly, in an area among the mountains 39 the chances of having reduced number of observable satellites increases.

For instance, if at time $T_2$ (at point $P_9$) just one satellite alone is observable, point $P_9$ need only be determined by means of the compound computation system by using the information on the one satellite that was observed at time $T_1$ at the previous point $P_8$ and the vector quantity for the amount of shift utilized for the inertial navigation from point $P_8$ to point $P_9$.

The points $P_{10}$ through $P_{14}$ are determined similarly. When a plurality (for instance, three) of satellites become observable, it is only necessary to display the result of computation by the GPS computing means 7, as indicated for point $P_{15}$. In the figure, the coordinates computed by the compound computation system are indicated by a small triangular mark.

As in the foregoing, by arranging to display the coordinates of the vehicles as determined by the GPS computation system and the compound computation system in addition to the inertial navigation, it becomes possible to display the vehicle locus extremely accurately, providing a vehicle guidance which is highly reliable.

Although the vehicle is assumed to be in motion for all times in the compound computation system in the above, it is to be noted that it is possible to determine the vehicle position by making observation on two satellites at times with a time interval while the vehicle is standing still for a fixed length of time, and they by applying the system shown in the flow chart of FIG. 11.

Various modifications will become possible for those skilled in the art after receiving the teachings of the present disclosure without departing from the scope thereof.

What is claimed is:

1. A system for measuring the position of an object comprising:
    receiving means for receiving navigational data radiated from a plurality of satellites and calculating position data and propagating delay time data based on the navigational data received from the plurality of satellites;
    computing means, coupled to said receiving means, for calculating the position of the object when said receiving means receives navigational data from at least three satellites, based on the position data and the propagating delay time data calculated by the receiving means;
    vector means for detecting the velocity and the angular velocity of the object and calculating a shifted vector amount caused by the displacement of the object during a predetermined time interval based on the detected velocity and the detected angular velocity of the object; and
    compound computing means, coupled to said receiving means and said vector means, for calculating the position of the object when said receiving means receives data from at least one satellite but less than three satellites, based on the position data and the propagating delay time data calculated by the receiving means and the shifted vector amount calculated by the vector means.

2. A measuring system as claimed in claim 1 wherein said compound computing means calculates a first circle on which the object is located by intersecting the earth's sphere and a sphere around one of the satellites on the basis of the propagating delay time data received from the receiving means, and calculating a displaced circle by displacing the first circle based on the shifted vector amount received from the vector means, said compound computing means further calculating a second circle on which the object is located on the basis of the propagating delay time data received from the receiving means after the predetermined time interval, by intersecting the earth's sphere and a sphere around one of the satellites, and calculating the position of the object by intersecting the displaced circle and the second circle.

3. A measuring system as claimed in claim 1, wherein said computing means comprises GPS computing means which determines the position of the object on the basis of the navigational datal received from at least three satellites.

4. A measuring system as claimed in claim 1 further comprising guidance means, coupled to the computing means, the vector means and the compound computing means, for displaying the position of the object, said guidance means displaying the position of the object received from said computing means when said receiving means receives navigational data from at least three satellites, the position of the object received from the compound computing means when said receiving means receives navigational data from at least one and less than three satellites, and the position of the object based on the shifted vector amount received from said vector means when said receiving means receives no navigational data.

5. A measuring system as claimed in claim 4, wherein the position of the object is calculated according to the spherical coordinates of the earth with a radial variable constantly fixed to the earth's radius.

6. A measuring system as claimed in claim 5, wherein the constant radial variable is corrected using geoid.

7. A measuring system as claimed in claim 6, wherein said measuring system further comprises an altimeter measuring the altitude of the object and further correctng the constant radial variable.

8. A measuring system as claimed in claim 1, wherein said vector means comprises an optical fiber gyro for detecting the angular velocity of the object and a sensor for sensing the velocity of the object.

* * * * *